Aug. 23, 1955        J. R. FORD        2,716,186
SIGNALLING SYSTEM
Filed Dec. 28, 1949        9 Sheets-Sheet 9
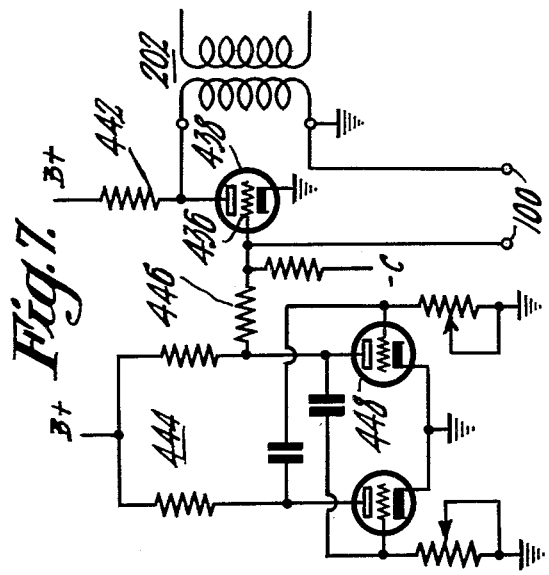
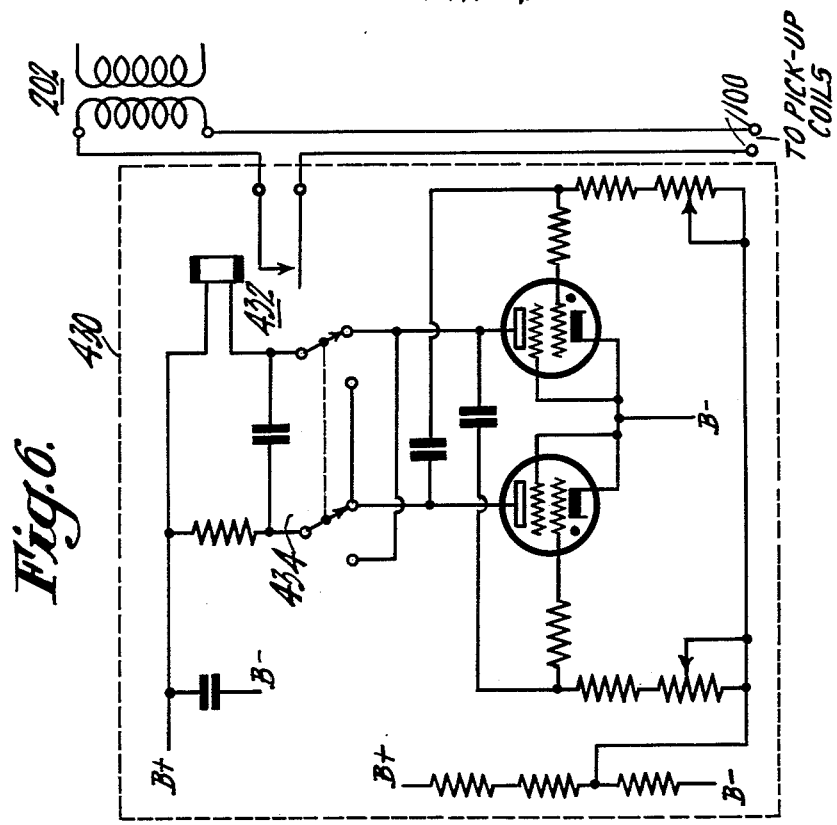
INVENTOR
John R. Ford
BY
J. L. Whittaker
ATTORNEY

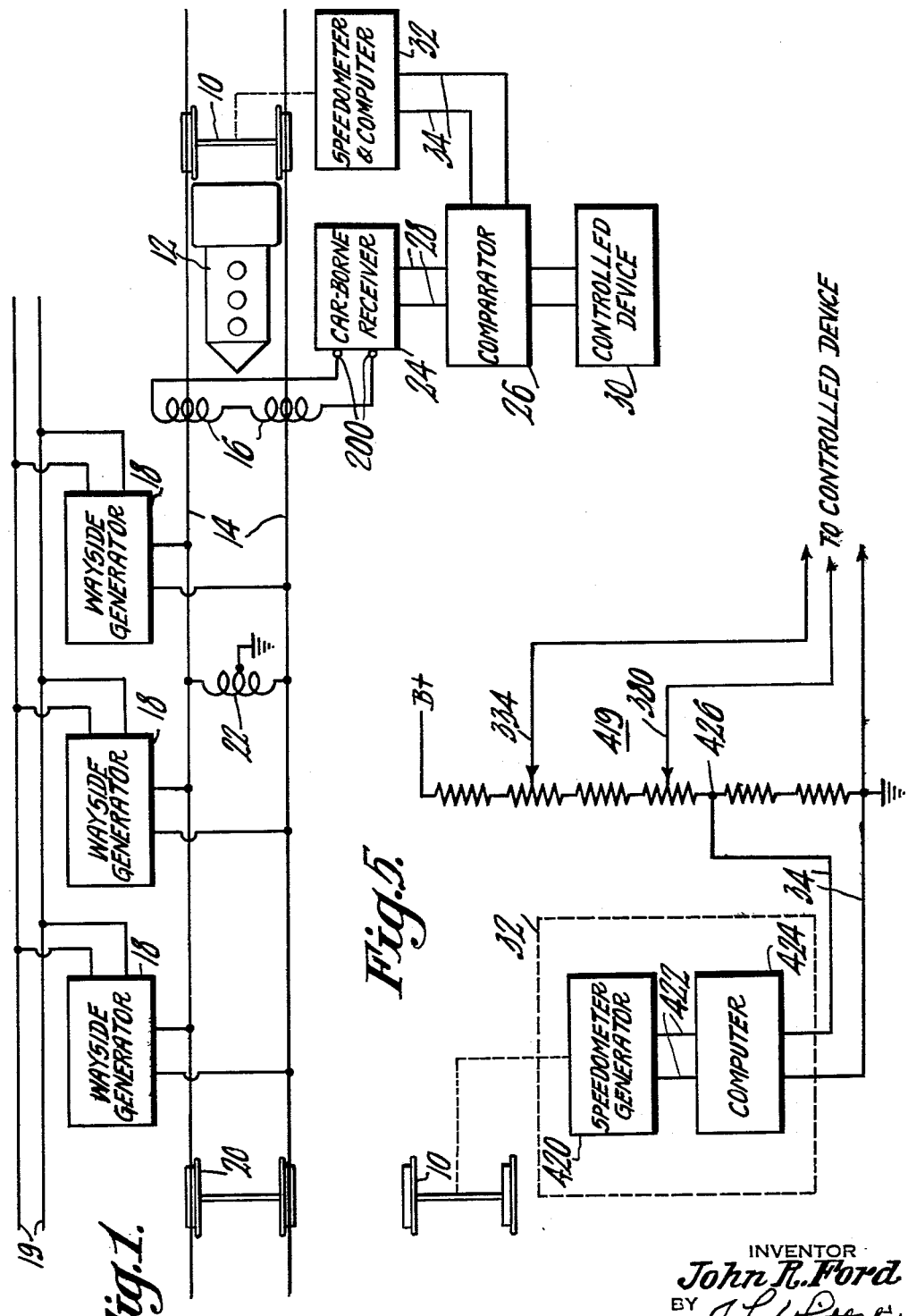

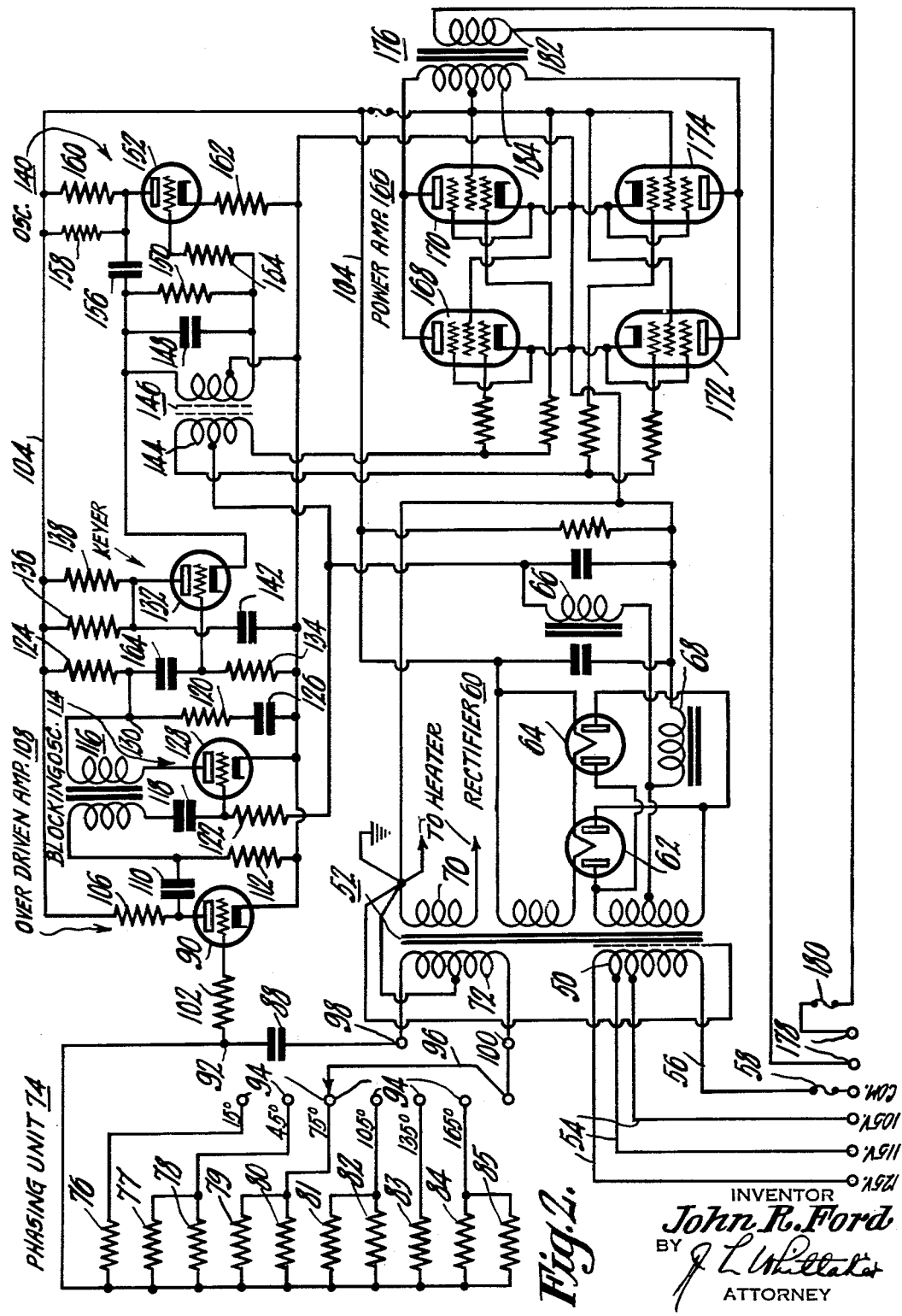

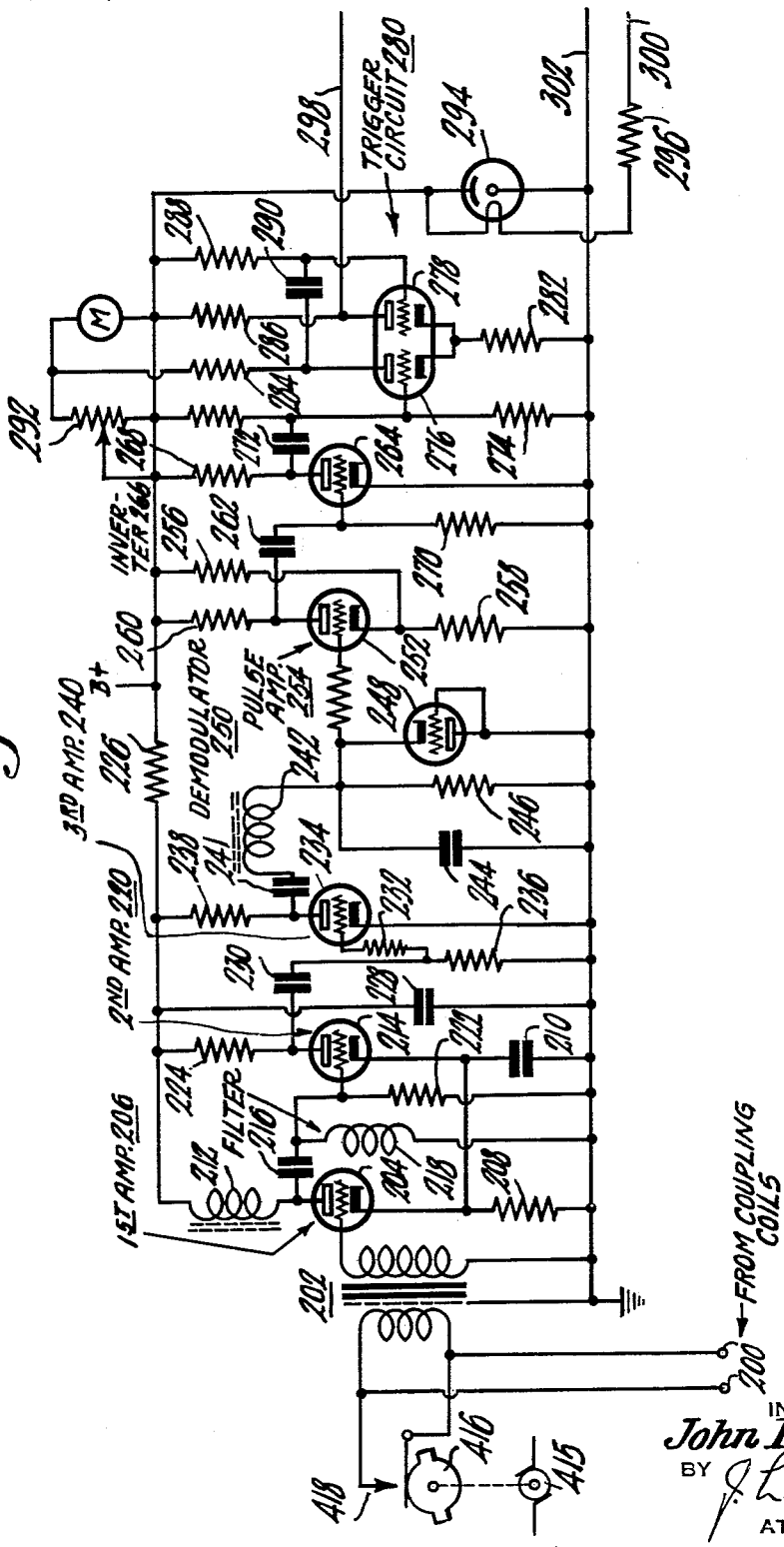

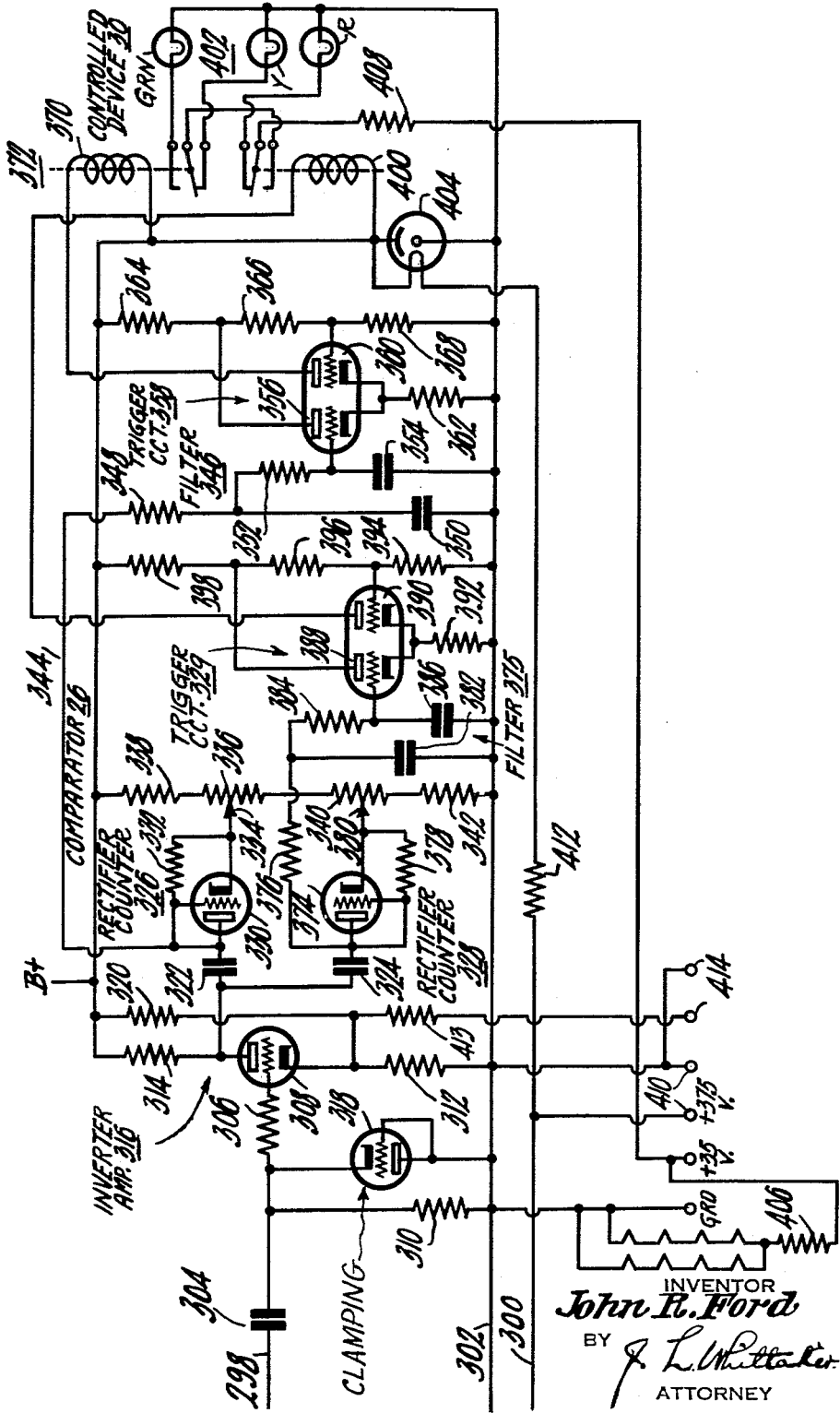

United States Patent Office 2,716,186
Patented Aug. 23, 1955

2,716,186

SIGNALLING SYSTEM

John R. Ford, Narberth, Pa., assignor to Radio Corporation of America, a corporation of Delaware Application December 28, 1949, Serial No. 135,347

15 Claims. (Cl. 246—63)

This invention relates to signalling systems.

It has been proposed to provide a traffic signalling system in which generators of pulse-modulated energy are spaced along a transmission line along the right of way. For example, the traffic system may be a railway system in which the transmission line may be the rails of the railway system. Reference may be made to the copending application of William R. Ayres, Serial No. 135,478, filed at the same time as this application and entitled "Signalling System," now abandoned. The transmission line is short circuited at a receiving train and also at the next train in advance thereof, so that the number of generators transmitting pulses between the trains is counted by a receiver carried by the leading car of the following train thereby affording an indication of the distance between trains. The distance measure between trains may be compared with a distance measure derived from and dependent upon the speed of the receiving train, for example by comparing voltages proportional to or dependent on both distances. A controlled mechanism such as warning lights, brakes, or the like is actuated according to the results of the comparison. The present invention is also applicable to other railway signalling systems. It will be recognized that such systems as the one described are subject to failures which may cause erroneous actuation of the controlled mechanisms and lead to serious accidents on a railway system.

It is an object of the invention to make operation fail-safe in a signalling system.

It is another object of the invention to make fail-safe a railway signalling system particularly of the type employing signals carried by the train for observation by an operator thereof.

It is a further object of the invention to prevent the failure of any system component of a railway signalling system in which a continuously operative cab-carried indicator is employed for causing a safe indication under danger conditions.

These and other objects, advantages, and novel features of the invention will be more apparent from the following description taken in connection with the following drawings in which like reference numerals refer to like parts and in which:

Fig. 1 is a schematic block diagram of a railway signalling system, with which the invention may be used;

Fig. 2 is a detailed diagram schematically showing the circuits utilized in the wayside generator of the system;

Figure 4A:
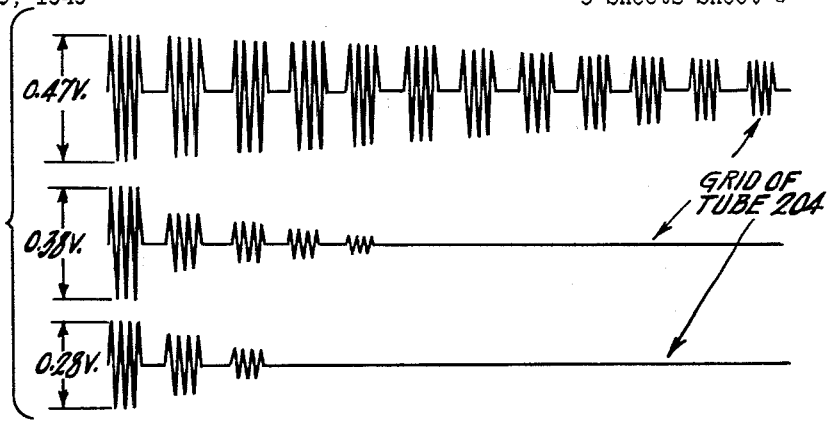

Figs. 3a and 3b together are diagrams schematically illustrating the circuits of a car-carried receiver and signal lights controlled thereby and also the means of the invention for securing fail-safe operation by cyclic signal interruption;

Figs. 4a to 4k illustrate a series of wave forms which may be observed by an oscilloscope in a car-borne receiver such as the one schematically illustrated in Fig. 3;

Fig. 5 is a diagram schematically illustrating the manner in which the circuits of Fig. 3b may be modified with the controlled device being actuated in accordance with the presence or absence of a train or other obstacle within a safe braking distance dependent on the train speed of the following train;

Fig. 6 is a diagram schematically illustrating the manner in which an alternative signal interrupting means using electronic circuits could be substituted for the mechanically operated signal interrupting means of the invention illustrated in Fig. 3; and Fig. 7 is a diagram schematically illustrating an all electronic circuit to accomplish cyclical signal interruption and restoration.

It will be understood that the present invention is applicable to any system employing a continuously operative cab or car-borne signal device to be observed by the operator of the train of a traffic system. Where there are no rails, or the rails do not lend themselves to forming a transmission line, a suitable transmission line may be supplied. As specifically illustrated, the invention is applied to a signalling system utilizing such a cab-carried signal which displays a green light on receiving signals from a certain predetermined number or more of generators in advance of the train, a yellow light if a lesser than the said predetermined number is received but more than a fixed minimum number, and a red light if signals are received from a minimum number or less of generators. The method comprises interrupting the received signals, whereby less than the minimum number of signals per second are being received and the red warning light is flashed, the interruption being carried out for a brief period of time sufficient to actuate the red warning light. Thereupon the signals are again allowed to actuate the warning system and if the track way is safe, a green light or a yellow light is displayed as the track conditions may warrant. The operation of interruption of the signals is cyclically repeated at a fixed rate, preferably with the interrupted periods being of a shorter duration than the non-interruption or signal-applied periods of a cycle. By this means the entire system is repeatedly tested. If the danger signal is not repetitively actuated, the operator is thereby warned either of a system failure or a danger condition on the track way. Thus completely fail-safe operation is secured. It is preferred that the signals be intercepted or interrupted preferably at a point as near as possible at their point of reception in the car-carried equipment. The interruption may be accomplished by mechanical means utilizing mechanically made and broken short circuits or electronic equipment may be used partially or entirely to accomplish the cyclic signal interruption.

*The system.*—Referring now more particularly to Fig. 1, the front wheel and axle assembly 10 of a train 12 rides upon a pair of rails 14. In advance of the wheel and axle assembly 10 and immediately over each rail respectively is carried a pickup coil 16. Each pickup coil may comprise a powdered iron core having about 1100 turns of No. 26 wire wound on a ⅞ inch core diameter about two inches long axially. The coil axis is carried horizontally and perpendicular to the length of the rails, with the coil suspended about six inches above the rails.

At spaced intervals (satisfactory intervals were 300 feet in one installation) connected in shunt across the rails 14 are wayside generators 18 which generate pulses of high frequency energy. The generators 18 are supplied with power by a conventional 60-cycle, 110-volt line 19. A train in advance of train 12 substantially short-circuits the rails with a wheel and axle assembly 20. In the railway system under consideration, the rails comprise part of the return circuit for the D. C. which generates the motive power for the train. Accordingly, the rails must be electrically returned for D. C. to a common ground conductor for the D. C. system. The rails are returned to the common ground conductor for D. C. (conventionally shown) through an inductor 22 having high impedance to the carrier frequency of wayside generators 18 and low impedance to D. C. The coils 16 are connected to a car-borne receiver 24, the output from which is connected to a comparator 26 by connection 28. The output of the comparator is connected to a controlled device 30 which is controlled in accordance with the comparator output. A speedometer generator and computer 32 may be mechanically coupled to the wheels of train 12 and has an output which is supplied to the comparator by a connection 34, if such a generator is to be used.

In the operation of the system schematically illustrated in Fig. 1, wayside generators 18 include phasing units which determine at which point in each cycle of the alternating power on line 19 the generator will start generating high frequency energy. The energy is generated in pulses of substantially 15 electrical degrees of the 60 cycles and at a carrier frequency of 8 kilocycles a second. Accordingly, each pulse of high frequency energy at 8 kilocycles a second generated by wayside generators 18 comprises 5 or 6 cycles of 8 kilocycles a second energy. The energy is fed to the rails 14 which act as the pair of conductors of a two conductor transmission line. It is apparent that the energy is restricted to within the distance between the wheel and axle assemblies 10 and 20 which short-circuit the rails 14. The reflection of high frequency energy from wheel and axle assembly 20 causes no confusion of signal because the length of rails 14 between wheel and axle assembly 20 and the wheel and axle assembly 10 is sufficiently short for practical purposes compared to a wavelength at the operating carrier frequency so that reflections all fall substantially within the period of generation of that signal pulse from which they arise. The pickup coils 16 pick up the energy and feed it to the car-borne receiver which demodulates the energy and counts the number of pulses a second received. These pulses are generated at each wayside generator 18 at times separate and distinct from the pulsing or generating periods of any nearby generator 18. Consequently, the number of pulses received a second is an indication of the number of wayside generators 18 between the wheel and axle assembly 10 and the wheel and axle assembly 20. A signal is derived in receiver 24 representing this count, which may be directly proportional to the count and which is a measure of the number of generators between the wheel and axle assemblies 10 and 20. The measure is one of distance between wheel and axle assemblies 10 and 20 to the nearest integral number of spaces between generators 18 if the generators 18 are spaced at equal intervals. It may be desirable under some circumstances to make the distance between generators 18 non-uniform, for example, spacing them farther apart on downgrades and closer together on upgrades in the interests of safety.

The voltage dependent on the number of generators 18 may be fed to a comparator where it is compared with a voltage which is proportional to or representative of a safe braking distance in advance of train 10. If it is not desired to utilize a fixed voltage (representative of a fixed safe braking distance) for comparison purposes, a further refinement may be introduced by mechanically coupling a speedometer generator and computer 32 to the wheels of train 12 to produce a voltage on the connection 34 which is representative of or proportional to a safe braking distance, dependent upon the speed of train 12. Controlled device 30 is actuated in accordance with the results of the comparison in comparator 26.

WAYSIDE GENERATOR

*Rectifier and phasing unit.*—Referring now to Fig. 2, which is a diagram schematically illustrating wayside generator 18, the connection to power line 19 is made between the primary 50 of a power transformer 52 through any one of three alternative leads 54 connected to primary 50 and through the common side through a lead 56 and a fuse 58. The actual one of the wires 54 which is used depends upon the voltage drop which has occurred in the 60-cycle line to the point of connection, the highest voltages on the line being fed to the terminal labeled "125 v.," which is therefore stepped down somewhat more in the secondary than if the connection is made at other points. A conventional rectifier 60 comprising two tubes 62 and 64 provides D. C. voltage supply for the various units in the tube. The rectifier 60 is conventional except that it has two inductors 66 and 68, whereas more conventional rectifiers may use only one inductor. In this instance, it is desired to secure a fixed biasing voltage for part of the amplifier tubes, while retaining a choke-input filter connection in the interests of long rectifier tube life. A secondary winding 70 of transformer 52 provides power for the heater of the various tubes, the heaters not being shown in order to simplify the diagram. A further secondary winding 72 is connected to a phasing unit 74. The phasing unit comprises various resistors 76, 77, etc. to and including 85, with values shown and a capacitor 88 of ½ microfarad. In some instances paralleled resistors are used to produce a suitable resistance with components of common resistance values. Voltage to the grid of a vacuum tube 90 is taken from the junction 92 between the capacitor 88 and the resistors. With the connections shown (only resistors 79, 80 in parallel are connected in circuit) it will be apparent that the junction 92 at which the voltage is taken, has a particular phase shift (about 75°) with respect to the line voltage. This phase shift will be different depending upon which of the terminals 94 are connected by the link connector 96 to one side of the secondary winding 72. The various phase shifts shown on the different leads result with the link 96 connected to the various terminals 94. The phase shift thus secured between the line signal and the signal fed to the grid of tube V–1A is less than 180°, but each of these plus a further 180° of phase shift can be secured by reversing the connections to terminals 98 and 100 of the secondary winding 72.

*Overdriven amplifier circuit.*—The signal applied to the grid of tube 90 passes through a resistor 102 connected serially between the junction 92 and the grid, which serves as a limiting and isolating resistor to avoid the resistance of the periodically conducting grid upsetting the phase-shifting relationship secured by the desired connection to the unit 74. The rectifier 60 supplies B+ at 280 volts positive with respect to a conventional ground over a B+ supply lead 104. Vacuum tube 90 receives power from supply lead 104 through resistor 106. The circuit 108 associated with tube 90 is a typical amplifier circuit and is well-overdriven.

*Differentiator and blocking oscillator.*—The output of amplifier circuit 108 is substantially a 60-cycle per second square wave which is differentiated by the capacitor-resistor combination of capacitor 110 and resistor 112, from the junction of which voltage is fed to a blocking oscillator circuit 114 comprising transformer 116, a capacitor 118, resistors 120, 122, and 124, and capacitor 126 and a vacuum tube 128. The blocking oscillator 114 is supplied with approximately a minus 34 v. bias from the rectifier 60 via the inductor 66 and thence through grid resistor 122. The blocking oscillator 114 is normally quiescent due to this bias. On the positive pulses of each positive and negative pulse which results from the differentiation of the square wave output from overdriven amplifier 108 the blocking oscillator 114 breaks into oscillation and produces at the junction 130 between resistor 120 and transformer 116 a negative-going pulse. In other words, the blocking oscillator 114 is of the type which is damped to produce only a half-wave of oscillation. The frequency of oscillation of the blocking oscillator is about 720 cycles per second so that a half-cycle has a duration of about 1/24 or 15° of a period of the 60-cycle per second alternations of the supply line.

*Oscillator and keyer.*—The negative-going pulses from blocking oscillator 114 are applied to the grid of a vacuum tube 132 which normally is conductive. The circuit associated with vacuum tube 132 serves as a keyer to key an oscillator 140 and includes resistors 134 and resistors 136 and 138, the latter two connected in parallel in the anode circuit of tube 132, and a capacitor 142 connected between the ground conductor and the anode of vacuum tube 132. The cathode of vacuum tube 132 is connected to the primary 144 of a powdered iron core transformer 146 which is resonated with a capacitor 148 and the resonant circuit shunted by a resistor 150. The latter inductor, capacitor and resistor are associated in an oscillator circuit 140 with vacuum tube 152, the oscillator circuit 140 including resistor 154 in the grid circuit thereof and a blocking capacitor 156 and resistors 158 and 160 in the anode circuit thereof, and resistor 162 in the cathode circuit thereof. The oscillator circuit 140 is one form of a Hartley oscillator. The vacuum tube 132 being normally conductive, has the effect of connecting the capacitor 142 between ground and the "hot" side (for the oscillator frequency) of the resonant circuit of oscillator 140, thereby damping the oscillator circuit and preventing oscillation. Upon application of the negative-going pulse from junction 130 to the grid of vacuum tube 132 through capacitor 164 the shunting impedance of the keyer tube 132 is disconnected because vacuum tube 132 is driven to be cut off, and the Hartley oscillator 140 breaks into oscillation at a frequency of about 8 kilocycles per second. The output from the Hartley oscillator 140 is taken from the secondary 144 of transformer 146.

*Power amplifier.*—A power amplifier 166 comprising vacuum tubes 168, 170, 172, and 174 connected in push-pull parallel to receive the signal from transformer 146 amplifies the 8 kilocycles per second pulses. Biasing voltage is supplied the power amplifier 166 through the center tap of secondary 144. The output from the power amplifier 166 is applied through transformer 176 to output terminals 178 which lead to connections directly welded respectively to each side of the tracks 14 shown in Fig. 1. The output transformer 176 is designed to apply efficiently the output of the power amplifier stage 166 in shunt feed to the tracks 14. I have taken a figure of about 1 ohm for the load impedance to which maximum power should be delivered, since I have found in the particular tracks on which the circuit of Fig. 2 was employed that the impedance of the rails is about 1 ohm per 100 feet at 8 kilocycles per second, and if a train short-circuits the tracks anywhere from 50 feet or less beyond the transformer connections thereto, a sufficient amount of power is picked up by the coil 16 of Fig. 1 to actuate the receiver. A step-down transformer 176 of a voltage ratio of about 60:1 has been successfully employed. Fuse 180 is designed to break the circuit if the Hartley oscillator is not keyed off and the power amplifier 166 transmits continuously. When fuse 180 breaks the circuit no signal is applied to the rails. Failure of the generator to feed pulses to the track is on the safe side, as mentioned hereinafter.

It is desirable from the standpoint of the operation of the system that the generators spaced along the rails will not, by their cumulative shunting effect, impose too heavy a load upon each other. The generators are phased so that only one out of every twelve consecutive generators is transmitting at one time. Accordingly, the requirement is that the impedance at the secondary 182 of transformer 176 looking back into the primary 184 during the quiescent period shall be reasonably high compared with the impedance across the rails at the carrier frequency of 8 kilocycles per second. The output transformer 176 has the primary 182 and secondary 184 tightly coupled and the primary 182 is resonated by its distributed capacitance at about 8 kilocycles per second. The resonance may also be accomplished, of course, by actually using a capacitor if a different transformer is used. The result is that a very high impedance which is substantially resistive is seen from the secondary side of transformer 176. Reactive components would in general be undesirable, since they might cause, by a cumulative effect, an appreciable phase shift of the signals transmitted down the rails 14, and might cause interference between two signals received at the same time, causing a false indication at the receiver. The impedance to A. C. from anode to cathode of tubes 168, 170, 172, and 174 during the time they are biased beyond cut-off is so great in comparison to the transformer impedance that the impedance of the tubes may be neglected.

CAR-BORNE RECEIVER

*First amplifier and filter.*—Referring now more particularly to Figs. 3a and 3b, which include the means of the present invention and which are diagrams schematically illustrating the car-borne receiver 24, a comparator means 26, and a controlled device 30 including in this instance signal lights, and referring first to Fig. 3a, the terminals 200 are connected to the coupling coils 16 (not shown in Fig. 3) which have already been described in detail in connection with Fig. 1. The coils are connected so that the signals aid and are applied to the primary of a transformer 202 of Fig. 3a which in turn applies the signal to the grid of a vacuum tube 204. The amplifier circuit 206 associated with vacuum tube 204 includes a cathode resistor 208 and a by-passing capacitor 210 to give cathode bias, and an inductor 212 as anode impedance. The output from amplifier circuit 206 is fed to the grid of the following tube 214 through a capacitor 216. Inductor 218 is connected between the capacitor 216 and ground. The capacitor 216 and inductor 218 serve as a high pass filter which cuts off at about 4 kilocycles per second and improves the signal to noise ratio by reducing interference due to transients picked up from the rails by the coils 16.

*Second and third amplifiers.*—The circuit 220 associated with vacuum tube 214 including the grid resistor 222 and the anode impedance 224 is a second amplifier circuit, the output across the anode impedance 224 being therefore substantially a series of 8 kilocycles per second pulse-modulated signals. The resistor 208 and capacitor 210 combination also supply bias in the cathode circuit of vacuum tube 214. Resistor 226 is a voltage dropping resistor and capacitor 228 is a smoothing capacitor. The signals developed across anode resistor 224 in second amplifier circuit 220 are fed through capacitor 230 and through a resistor 232 to the grid of vacuum tube 234, the latter having a grid resistor 236 and having for an anode load resistor 238. The signal is amplified in the third amplifier circuit 240 associated with vacuum tube 234. There is a grid clamping action due to grid current and resistor 232, whereby the grid of tube 234 cannot be driven appreciably positive.

*Demodulator.*—Inductor 242, capacitor 241 and resistor 246 filter the high frequency from the output of third amplifier circuit 240. Capacitor 241 is a block for D. C. biasing. The potential on the grid of tube 254 between pulses is essentially clamped to zero by the diode connected triode 248. At the grid of vacuum tube 252 the filtered and demodulated signal appears as a discrete series of substantially square wave positive-going pulses, as many of these pulses appearing consecutively about every 30 degrees of a cycle of the 60-cycle signal as there are generators 18 between train 12 and the train in advance thereof, as will be explained more fully hereinafter in connection with the wave forms which are illustrated in Fig. 5. Vacuum tube 248 may be considered as serving also as a D. C. restorer or clamping tube, as it is sometime called.

*Pulse amplifier.*—The amplifier circuit 254 associated with vacuum tube 252 to amplify the demodulated pulses is cathode biased by the divider system of resistors 256 and 258 serially connected between the B+ supply and ground, the junction being connected to the cathode of vacuum tube 252. Resistor 260 serves as the anode impedance for pulse amplifier circuit 254. Because of the cut-off cathode bias fed the vacuum tube 252 by resistors 256, 258, this tube is biased to be cut off with no signals applied, and is substantially insensitive to any except signals of appreciable amplitude in a positive-going sense appearing at the grid of vacuum tube 252.

*Inverter.*—The signals developed across resistor 260 are fed through capacitor 262 to the grid of vacuum tube 264 in a circuit 266 including a load resistor 268 and a grid resistor 270. The vacuum tube circuit 266 amplifies and inverts the demodulated signal so that at the anode of tube 264 the signal appears as a series of positive-going substantially rectangular pulses.

*Differentiator and first counter.*—The rectangular pulses are differentiated by the combination of capacitor 272 and resistor 274. Vacuum tubes 276 and 278 which may be a double triode as shown, are connected in a trigger circuit 280 comprising cathode resistor 282 and anode resistors 284 and 286 in the respective anode circuits of the tubes 276 and 278, and a resistor 288 which is connected between the B+ supply and the grid of tube 278. A feedback capacitor 290 is connected between the anode of tube 276 and the grid of tube 278. An ammeter M is connected between resistor 284 and the B+ supply and a variable resistor 292 is connected across the meter.

In the operation of this portion of the circuit, the differentiating combination of capacitor 272 and resistor 274 provides one positive-going and one negative-going triangular shaped pulse of about 100 microseconds in duration corresponding respectively in time to the leading and trailing edge of each positive-going substantially rectangular pulse signal appearing at the anode of vacuum tube 264. In the trigger circuit 280, vacuum tube 278 is normally maintained conductive by reason of the voltage fed through resistor 288 to the grid thereof. Thus the circuit has one stable state. Upon one of the positive-going triangular differentiated pulses appearing at the grid of vacuum tube 276, the last-mentioned tube begins conducting and as well understood by those skilled in the art, a pulse of substantially fixed magnitude and time duration is produced by the trigger circuit which is self-restoring to its stable state in a period of time determined by the circuit constants. The length of each trigger circuit pulse is chosen to be substantially equal to the pulse length of the high frequency pulses emitted by each generator 18 by proper design of the circuit constants. Thus each pulse produced by the trigger circuit 280 has a time duration of about 600 microseconds, and the pulses do not overlap each other. The ammeter M which is about 1800 ohms in resistance, measures the current through the anode circuit of 276 and thereby serves as a counter of the number of high frequency pulse modulated signals which are being received per second by car-borne receiver 24 by counting the secondary pulses generated in the trigger circuit 280. Inertia of meter M is sufficient to give a smooth indication without flickering of the needle of the meter and yet not so great as to prevent prompt response to a change in count. The meter M may therefore be calibrated to provide a visual indication of the number of generators 18 between train 12 and the next train or short circuit or open circuit in advance thereof. Calibration is readily accomplished by adjusting resistor 292 to provide a full scale deflection for ammeter M when the maximum number of pulses are received to provide a safe indication. The meter scale may be divided into green, yellow, and red parts so that the meter pointer enters upon the yellow when there are, say, three to five generators 18 the pulses of which are being received by train 12 and a red or danger indication being shown when there are less than three generators 18 emitting high frequency pulses which are received by the receiver 24. If the generators 18 are spaced at equal distances along the track the ammeter M may be calibrated in feet or yards.

A voltage regulator tube 294 maintains the B+ supply of 150 volts above ground and is interlocked so that withdrawal of the tube removes the B+ supply from that portion of the receiver just described which carries the signals from 204 through tube 278. Two hundred and ninety-six (296) is a voltage dropping resistor.

*Clamping and inverter amplifier.*—Referring now to Fig. 3b in which leads 298, 300, and 302, connect with the portions of the car-borne receiver already described, signal voltage is taken from the anode of vacuum tube 278 of Fig. 3a on lead 298 through coupling capacitor 304 of Fig. 3b and through resistor 306 to the grid of vacuum tube 308 for which resistor 310 serves as grid resistor, resistor 312 serves as cathode resistor, and resistor 314 serves as the anode impedance. The vacuum tube circuit 316 associated with tube 308 inverts and amplifies the square wave signal appearing at the anode of tube 278. The diode connected triode 318 connected across resistor 310 acts as a clamping tube, and insures a substantially constant amplitude input signal voltage above the clamped ground voltage. Resistor 320 feeds a positive voltage to the cathode of tube 308 by its connection between the B+ supply and cathode resistor 312 to bias tube 308 suitably without necessitating a large signal degenerating resistance in the cathode circuit. The output from circuit 316 is a series of negative-going substantially square wave pulses each of substantially the same amplitude applied by way of capacitors 322 and 324 to two rectifying circuits 326 and 328, respectively, each circuit being similar in operation and circuitry but differing in details such as the time constants employed and voltages applied. Rectifying circuit 326 includes a diode connected triode 330 and a resistor 332, and the capacitor 322 feeding signals to the anode of tube 330. The cathode of the vacuum tube 330 is connected to a potentiometer arm 334 tapped across a resistor 336 which is one of a string of voltage dividing resistors placed between the B+ supply and ground and including resistors 338, 336, 340, and 342. It will be recognized in connection with inverter amplifier circuit 316 which also acts somewhat as a buffer stage, that the output signal pulses therefrom are each substantially fixed and identical in amplitude and pulse duration, partly by virtue of the operation of trigger circuit 280 and partly because of the action of clamping tube 318. Accordingly, the average voltage rectified in circuit 326 and developed across resistor 332 is proportional to the number of signals received per second and is consequently proportional to or a measure of the number of signal generators 18 connected across the tracks 14 between train 12 and the next train in advance thereof. Thus rectifier circuit 326 is therefore also a counter circuit. The average voltage developed on lead 344 with respect to ground is therefore proportional to a fixed voltage (picked up by potentiometer arm 334) minus a voltage proportional to the number of pulses received per second. Thus the interconnection of resistor 332 and the string of resistors 338, 336, 340, and 342 is a comparison circuit.

*Trigger circuit and controlled device.*—The voltage on lead 344 is applied to a resistor capacitor filter 346 which may be considered as a two-section low pass filter comprising resistor 348 and capacitor 350 for one section and resistor 352 and capacitor 354 for the second section. The voltage from the filter 346 is applied to the grid of vacuum tube 356 which is one of the tubes of a trigger circuit 358 having two conditions of stability, that condition assumed being dependent upon the voltage applied to the grid of tube 356. The trigger circuit 358 comprises tubes 356 and 360 which have a common cathode resistor 362. The anode of tube 356 is connected to a voltage divider system comprising the resistors 364, 366, and 368 disposed across the B+ supply and ground. The grid of vacuum tube 360 is connected at a lower voltage point in the same divider system. The trigger circuit 358 is a variation of a well known circuit termed the Schmitt trigger circuit. I prefer the employment of this trigger circuit here because the conditions of stability are changed as the voltage on the grid of tube 356 approaches a predetermined value from either a more positive or a more negative value. In effect, there is established a threshold voltage at which the circuit is triggered, the value being substantially the same whether the voltage is approached from more positive or more negative values. Hence the trigger circuit 358 is responsive to the comparison of voltages (the difference voltage on lead 344) being greater than or less than this threshold voltage. The anode of vacuum tube 360 is connected to the winding 370 of a relay 372 through which B+ voltage is supplied. The trigger circuit 358 by reason of the common cathode resistor can have only one of the tubes 356 or 360 conducting at a time, one of the tubes 356 or 360 at a time being conductive to the exclusion of the other. When the average voltage from lead 344 applied to the grid of 356 becomes less than a fixed threshold value determined by the constants of trigger circuit 358, and the voltages applied thereto, the vacuum tube 360 becomes conductive and relay 372 is actuated; whereas when the voltage applied the tube 360 exceeds substantially the same threshold voltage, vacuum tube 356 is conductive to the exclusion of vacuum tube 360 and relay 372 has no current in its winding 370 and is non-actuated. Thus, with a large number of pulses per second being received from several generators 18, there being a safe distance in advance of train 12 to the next train, relay 372 is actuated and the green signal light GRN is turned on provided relay 400 also is receiving current to actuate its contacts. Returning now to rectifier or counter circuit 328 comprising vacuum tube 374 and resistor 378, it will be apparent that its operation is similar to that of circuit 326. In comparing the developed voltage, however, the potentiometer arm 380 of resistor 340 determines a different fixed voltage from which the voltage developed across resistor 378 is to be subtracted. The filter 375 comprising resistor 376, capacitor 382 and resistor 384 and capacitor 386 is similar in operation to filter 346 to derive an average voltage which is proportional to a fixed voltage above ground minus a voltage proportional to the number of pulses per second received from generators 18. The trigger circuit 329 comprising vacuum tubes 388 and 390, the common cathode resistor 392 and the voltage divider system of resistors 394, 396, and 398 is similar to the divider of trigger circuit 326. Trigger circuit 329 need not be described further than to note that it causes actuation of relay 400 depending upon whether or not tube 388 or 390 is conductive and further that tube 390 becomes conductive thereby actuating relay 400 with a fewer number of pulses received from generators 18, than is required to make tube 360 conductive to actuate relay 372.

Referring briefly to the relay circuit 402, which is more or less self-explanatory, it is apparent that with a large number of pulses from generators 18 being received and relays 400 and 372 actuated, that the green signal light GRN is displayed. With a lesser number of pulses per second from generators 18 being received, relay 400 is actuated, relay 372 is not actuated and a yellow signal light Y is displayed. With a still lesser number of pulses per second being received from generators 18, neither relay 400 nor 372 is actuated and the red signal light R is displayed. When the red light is displayed, and relay 400 non-actuated, neither the green nor yellow light can be lit.

*Miscellaneous.*—A voltage supply of 35 volts which may be from car-carried batteries, provides power for the heaters of various tubes (with the exception of voltage regulator tubes 294 and 404) through a voltage dropping resistor 406 by connecting the heaters partially in series and partially in parallel as shown. The 35-volt supply also provides power to light the 28 volt signal lights with a dropping resistor 408 used to take up the excess voltage drop. A motor generator or other suitable D. C. supply may be used for the B+ supply to the various tubes with a nominal voltage rating of 80 ma. at 375 volts at terminals 410 and resistor 412 is merely a voltage dropping resistor. Tube 404 is a voltage regulator tube similar to tube 294. A pair of terminals 414 are connected, one to ground and one through an isolating resistor 413 to the cathode of tube 308 for ready observation of the wave shape forms at the cathode of tube 308.

FAIL-SAFE FEATURE

The means and method of making the system practically completely fail-safe in operation comprises periodically and repeatedly interrupting the signal voltage (preferably at the input) at a rate different from and slower than the pulse repetition rate. When the input voltage is short-circuited or otherwise cut off, the period of the interruption is made sufficiently long to cause the relay 400 to be non-actuated and the red signal light to come on. This period of interruption, however, is made sufficiently short so that at the highest speeds of travel the time during which the red light is on is short compared to the time in which the brakes must be applied for safety. The signal is then re-applied and, if the number of signals from generators 18 received by receiver 24 provide a safe indication, relays 400 and 372 are actuated and the green light is displayed. In this fashion the entire receiver is repeatedly and periodically tested. The periodic signal interruption may be applied in many different ways. I have illustrated in Fig. 3a a very simple device comprising a motor 415 (the power supplied thereto not being shown) driving a cam 416 at a substantially constant rate. The cam 416 actuates a switch 418, the switch being connected to the input terminals of the transformer 202 to short-circuit the input periodically. In this example, the switch may be closed at about the order of 0.5 of a second in every five-second period. The motorman or operator of the train during a safe condition then observes the green light GRN which is on for 4.5 seconds and the red light R then flashing on with the green light off for 0.5 of a second, this cycle of operation being repeated over and over again. If the number of generators signalling from the track and picked up by car-carried receiver 24 are such that only the yellow light is actuated, the signals observed by the operator will be the yellow light Y on for a period of 4.5 seconds and the red light R for 0.5 of a second, the cycles being repeated. Thus indications of danger and non-danger are cyclically repeated under non-danger conditions. Any other condition caused by non-operability of the receiver or the failure of any of its elements will necessarily cause a different type of signal to be received. For example, a steadily displayed green light is indicative of some component failure, as would be a steadily displayed yellow light. A steadily displayed red light indicates either a danger condition or a component failure. It will be apparent that the variation thus so readily made in the car-borne receiver makes it completely fail-safe in operation.

WAVE FORMS

Figure 4B:
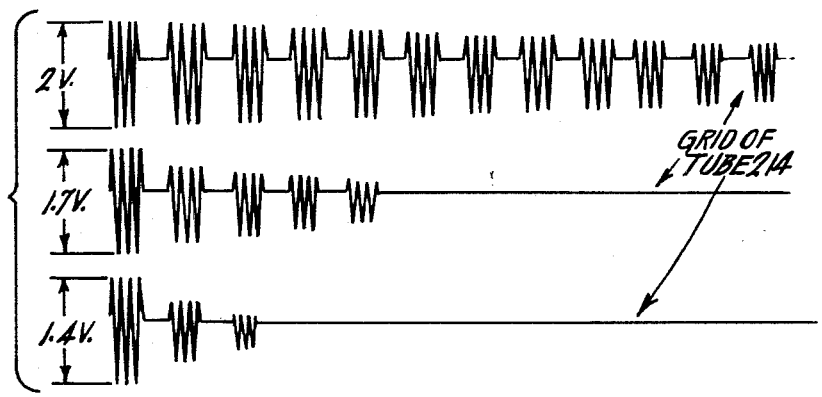
Figure 4C:
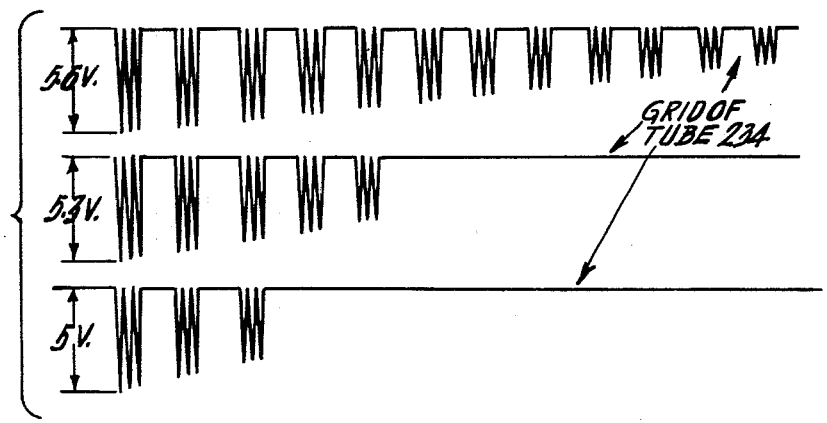
Figure 4D:
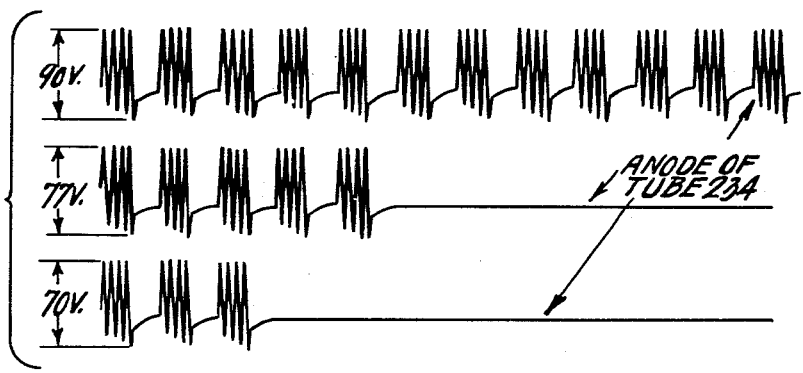
Figure 4E:
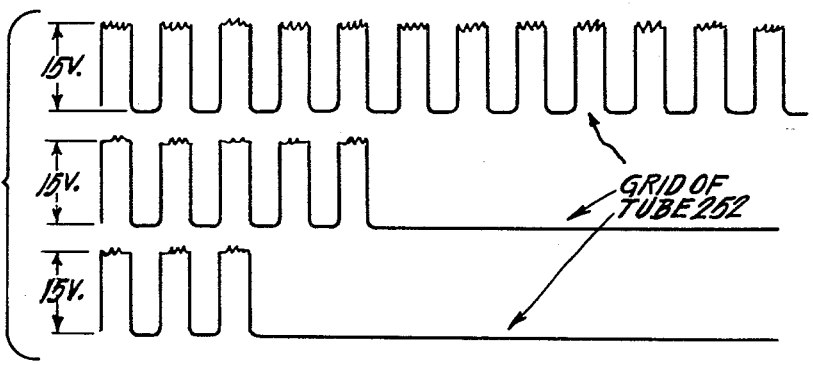
Figure 4F:
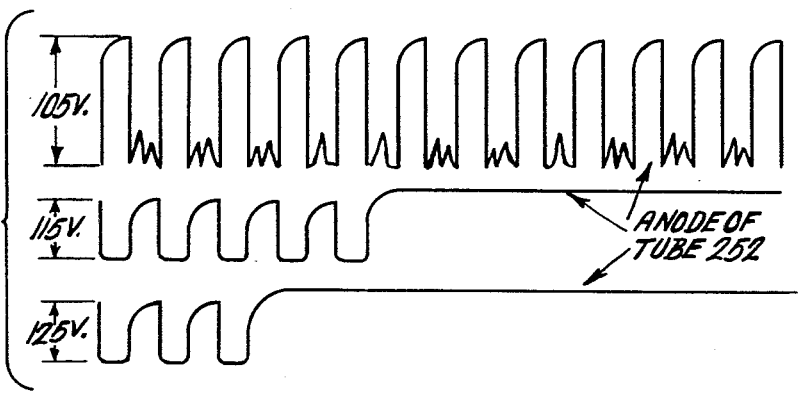
Figure 4G:
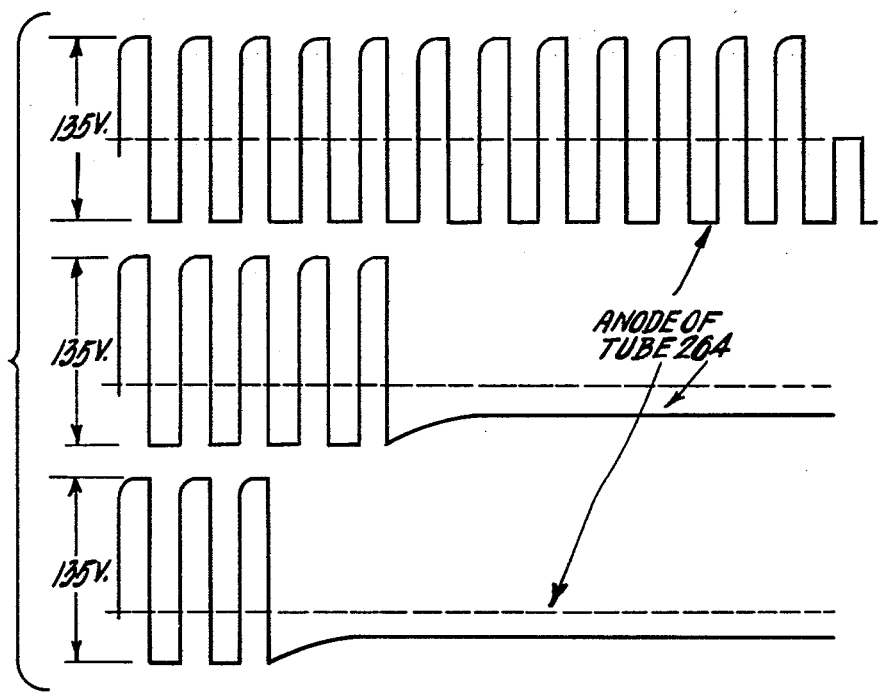
Figure 4H:
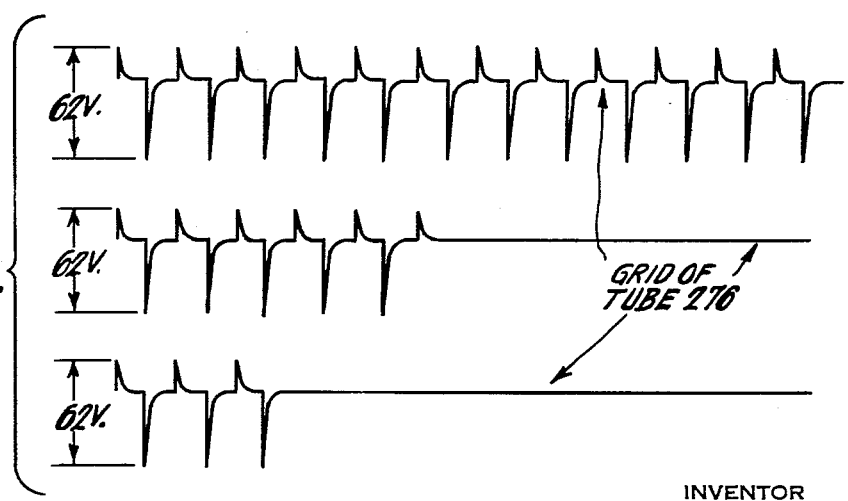
Figure 4I:
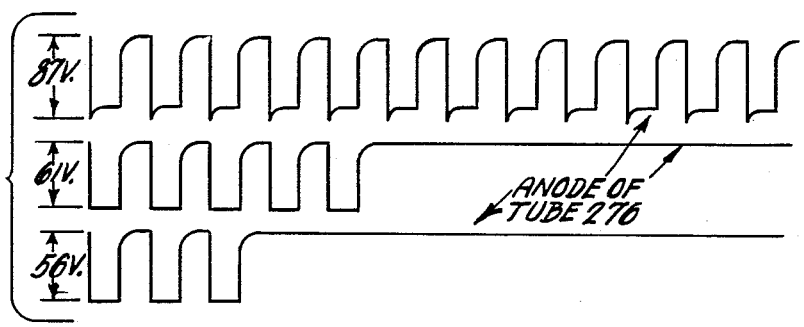
Figure 4J:
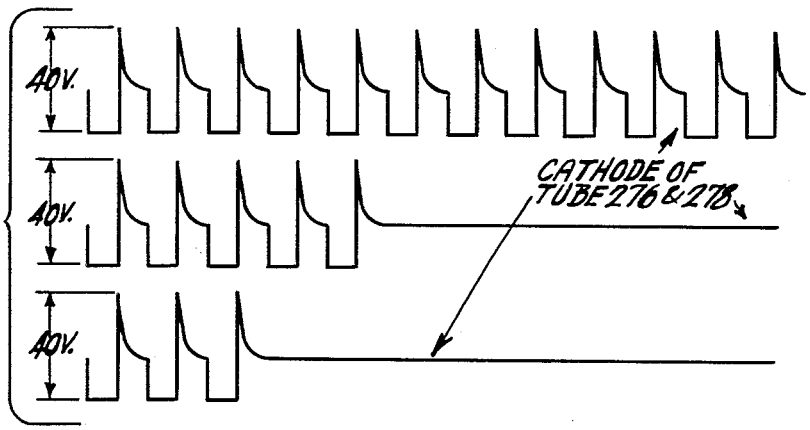
Figure 4K:
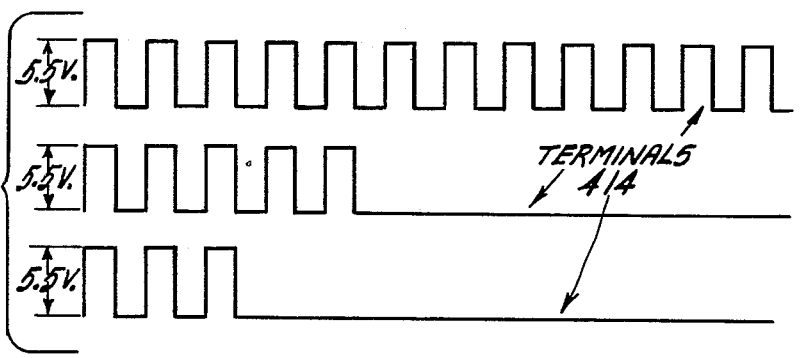

Referring now more particularly to Figs. 4a to 4k, there are illustrated a series of wave forms sketched from actual observation (but somewhat idealized by the draftsman) of oscilloscope patterns on the car-carried receiver 24, the schematic drawing of which is shown in Figs. 3a and 3b. Each of Figs. 4a to 4k has three lines, the first line corresponding to the wave forms observed at a particular point under conditions in which twelve generators 18 are located between train 12 and the next train in advance thereof, the second line illustrating the wave forms observed when there are only five such generators and the third line of each part illustrating the wave forms when there are only three such generators. The approximate voltage amplitudes are also indicated at the left side of each line for purposes of comparison. At the grid of vacuum tube 204 with twelve generators interposed between the wheel and axle assembly 10 of train 12 and wheel and axle assembly 20 of the next preceding train, there may be observed on a test oscilloscope as illustrated at line 1 of Fig. 4a, twelve discrete pulses of 8 kilocycles per second energy each pulse comprising 4 or 5 cycles of the 8 kilocycle energy. Line 2 of Fig. 4a illustrates the wave forms at the grid of vacuum tube 204 when only five such signals are being received. It should be noted that the maximum voltage amplitude of the wave forms at line 2 of Fig. 4a, is somewhat less than in line 1 and similarly the maximum amplitude of the wave forms at line 3 is somewhat less than that at line 2. The observed amplitude decrease is probably due to the increased loading caused by the short circuit due to wheel and axle assemblies 10 and 20 being spaced quite closely together. The wave forms illustrated in Fig. 4b show the amplification which has taken place when the signal reaches the grid of the vacuum tube 214. Fig. 4c shows the wave forms at the grid of the vacuum tube 234 where it will be observed that the maximum of the positive-going signal is substantially at ground voltage due to the action of grid conduction, the grid of the vacuum tube 234 together with the cathode of that tube acting as a clamping arrangement. Appreciable amplification is observed at the anode of the next vacuum tube 234. At the grid of the tube 252 as illustrated in Fig. 4e, may be observed the demodulated signals which are all substantially of the same amplitude. At the anode of vacuum tube 252 the signals have been amplified and squared off somewhat as shown in Fig. 4f. At the anode of vacuum tube 264, the signals are substantially square wave as illustrated by Fig. 4g. After differentiation signals from amplifier inverter 266 are shown in Fig. 4h, as observed at the grid of vacuum tube 276. The signal at the anode of vacuum tube 276 is shown in Fig. 4i. At the connected cathodes of tubes 276 and 278 the observed signal is as shown in Fig. 4j. The observed signals at the terminals 414 indicating the wave forms at the cathode of vacuum tube 308 are shown in Fig. 4k.

The voltage developed across resistors 332 and 378 average two volts for every signal pulse per cycle of 60 cycles per second per signal. Potentiometer arm 334 is arranged so that with (for example) more than five signals being received in every cycle of 60 cycles per second vacuum tube 356 is cut off and relay 372 is actuated and the green signal light is on. Potentiometer arm 380 is adjusted so that with (for example) more than three pulses received for every cycle of 60 cycles per second vacuum tube 388 is cut off and relay 400 is actuated. If there are less than five and more than three pulses for every cycle of 60 cycles per second, relay 372 has no current applied to winding 370 and relay 400 is actuated whereby the yellow signal light is on and the green is off. With three or less pulses being received for every cycle of 60 cycles per second, both the relays 370 and 400 are non-actuated and the red signal light is on and the green and yellow are off.

It should be recognized that a great many variations are possible in the equipment disclosed. I have preferred to use secondary pulses derived from the demodulation of the original pulses because these may be made considerably more uniform in time width and in amplitude with less difficulty than by using various stages of amplification. Furthermore, I prefer this arrangement because the signal generators need not be so critically designed to afford the same number of output cycles of 8 kilocycles per second energy for each pulse, nor need their amplitude of output be as critically identical. Many different circuits may be used other than the particular circuit illustrated, for example one might substitute for the trigger circuits shown other circuits which are known in which only one tube is used. I prefer to use double envelope tubes where possible although I have described the apparatus throughout as utilizing single envelope tubes. Thus tubes 204 and 214, 234 and 248, 252 and 264, 276 and 278, 318 and 308, 330 and 374, 388 and 390, 356 and 360 are twin triodes of the type 6SN7. It will be understood also that it might be desirable to connect the pick-up coils 16 of Fig. 1 to be used to feed a push-pull circuit in the car-borne receiver 26 which will aid in balancing out noise and undesired signals. Different frequencies than those here employed may be used. I have found it convenient to use a carrier frequency of 8 kilocycles per second but it is obvious that other frequencies might be employed and that other repetition rates might be utilized for the generators 18 with corresponding variations being made in the equipment. It will also be understood that if there are more than twelve generators between trains, the present system allows an overlap of signals which, however, present no particular danger or difficulty because the design is such that if the thirteenth signal would overlap the first signal, the first and thirteenth would appear on reception as a single signal and it being further understood that with twelve generators between trains the condition is always one of complete safety. However, by proper phasing or by using repetition rates other than that of once every cycle of 60 cycles per second or both it would be simple after having studied the present system to design one which would substantially do away with overlapping signals except possibly for signals from generators which are so very distant that attenuation of the track would reduce them practically to zero.

*System modification.*—It may be desired in conjunction with the present system to employ a proposal made in a prior application in which a voltage is developed dependent on the speed of the train and with which voltage the voltage developed dependent on the number of generators between trains is compared.

In Fig. 3b, the voltage developed across resistor 332 of rectifying circuit 326 is compared with the voltage determined by the position of potentiometer arm 334 on the voltage divider system of which resistor 336 is a part. The comparison is made by subtracting the voltage developed across the resistor 332 from the voltage picked up by the potentiometer arm 334. The subtraction results in a voltage on lead 344 which triggers the trigger circuit 358 to one condition or the other depending on whether the resultant or difference voltage is greater than or less than the threshold voltage at the grid of the tube 356. The trigger circuit 358 may thus be considered part of the controlled device which includes the relays and signal lights.

*System with speedometer generator.*—Referring now to Fig. 5, means are illustrated (in a simplified form) of modifying the circuit of Fig. 3 to compare a voltage dependent on the train speed with the voltage developed dependent on the number of generators between trains. The series of voltage dividing resistors are 338, 336, 340, and 342 are replaced by a series of voltage dividing resistors 419 of Fig. 5. A speedometer generator 420 of Fig. 5 is connected to a wheel and axle assembly of the train 12 such as the assembly 10. Any tachometer arrangement may be used which has an output voltage dependent on the speed of the train. However, I find it convenient to use a simple D. C. generator for the speedometer generator 420 the output from which may be directly proportional to the speed of the train. The output from the speedometer generator 420 is applied via connection 422 to a computer 424. The output voltage of the computer is some suitable function of the input voltage, which will be designated $V_v$ which is in this case positive with respect to ground and may be applied between ground and a point 426 on the voltage divider resistors 419. The potentiometer arms 334 and 380 at points increasingly positive on the divider system 419 show how the circuit of Fig. 5 is now interconnected in the circuit of Fig. 3, the changes described being the only ones necessary, provided the resistor values are appropriately chosen and the computer is suitably designed. Referring for example to the contact arm 334, it will be apparent that the more positive this voltage may be, due to greater train speed, the greater number of signals from generator 18 must be received in order to keep the green signal on through actuation of relay 372. If the voltage at point 426 becomes increasingly positive, so also does the voltage at the arm 334. Accordingly, if the speed of wheel and axle assembly 10 increases, the generator output at the connection 422 is increased and the voltage at point 426 will increase in a positive direction thereby making it necessary to have a greater number of generators between trains in order to secure a green signal. The voltage $V_v$ applied to the point 426 may be made a function of the input voltage at connection 422 and consequently a function of the speed which may be such that the number of generators being thereby required to actuate the green light is always greater than a safe number, due regard being had to the distance between generators, the time required to stop the train after the brakes are applied, that is, the braking distance, the reaction time of the operator and such other safety factors as may be desired. Various types of computers may be designed, for example as pointed out in the volume of Electronic Instruments, volume 21 of the Radiation Laboratory Series by Greenwood, Holdam, and MacRae, published by MIT in 1948. It will be apparent that what is accomplished by the circuit of Fig. 5 is to derive a voltage representative of an assured clear distance between trains and this voltage is compared with the voltage dependent on the number of generators between trains. The controlled device is actuated according to whether the results are greater or less than the threshold voltage mentioned hereinbefore which is the voltage necessary to change the condition of stability of the trigger circuits 328 or 358 of Fig. 3b. The voltage derived at arm 380 of Figs. 3 and 5 which actuates the yellow signal light is subject to similar variation by reason of the connection at point 426 of Fig. 5. It will be obvious that other circuits could be employed than the particular circuit shown in Fig. 5. It will also be apparent that if one is satisfied with a rather simple function for the computer, that the speedometer generator 420 may be designed to give an output voltage proportional, for example, to the square of the speed of the train without interposition of a separate computer device, and this voltage may be applied at the point 426 directly without using a separate computer.

In view of the foregoing description, it will be apparent that the system disclosed is exceedingly flexible and reasonable in cost to install and maintain. The pulse-modulated carrier current generators shunt-connected across the rails are most satisfactory in actual practice. The wayside generators 18 are readily and easily tested, for example, by replacement and it will be noted that failure of any single generator is a failure tending to give a safe indication. The car-carried receiver need not be installed upon every train permanently, but may be used on each train in service, and when the train is out of service, the receiver may be removed and used on a train about to enter service. It is obvious that this may be accomplished by suitable receptacles associated with the equipment. Moreover, the equipment is, in general, light in weight and compact. A typical car-borne receiver including the pickup lights is only 9 x 13 x 16½ inches. Typical wayside generators 18 are 8 x 8 x 14 inches overall enclosed in a suitably weatherproofed box. One point to be noted in connection with successful operation of the system is that if the railway system has rails one side of which is grounded, it may not be necessary to use the impedance bonds 22 as shown in Fig. 1 but only half of it. However, I have found that there is a coupling caused by the impedance of the track itself when one of the tracks is grounded only at spaced intervals rather far distant, say, every 1800 or more feet and therefore, I may prefer to use more frequent grounding of the grounded rail. A drawing of the circuit then existing considering that a stretch of track between the train 12 and the next ground connection in advance thereof may have an appreciable impedance, will disclose that signals from the generators in advance of train 12 may be transferred by a mutual impedance to the stretch of track in the rear of train 12. Therefore, I find it preferable to ground both sides of the rails 14 for D. C. current by the so-called impedance bond 22 thereby "floating" both rails at the carrier frequency. In lieu thereof one may ground one side of the rails 14 at very frequent intervals. The latter expedient in practice requires that welds be made at very frequent intervals along the track. It should be pointed out, however, that another way of electrically "floating" at the carrier frequency the one side of the rail grounded for D. C. is to use an impedance bond at that single ground connection alone which electrically could be represented by the portion of the impedance bond 22 of Fig. 1, between the ground connection and one side of the rail. In other words, if the rails are to be floating electrically for the carrier frequency, then care must be taken to be sure that for practical purposes of the system they are both floating completely, and if one of the rails is to be grounded electrically, both at the carrier current and for D. C. current, then care must be taken that ground connections be made with sufficient frequency along the grounded rail so that the rail is held at ground voltage through its length by frequent connections because the rail itself may have an appreciable impedance at the carrier frequency. These latter precautions are necessary of course where D. C. current is fed back through the tracks. In a typical steam railroad installation the rails may be found to be sufficiently insulated from each other and from any ground connection of the system so that the invention operates properly without extensive precautions being taken. As a specific embodiment of such impedance bond as 22, one may have the iron core coil previously mentioned or one may use a single heavy conductor on which a considerable number of iron washers are strung, the latter being a particularly inexpensive and expedient means for securing the desired impedance at the carrier current and still maintaining a good D. C. connection.

*Alternative signal interruption means.*—The circuit of Fig. 6 may be used instead of the signal interruption means using the motor driven cam and switch of Fig. 3a. Referring now more particularly to Fig. 6 the gas tube circuit 430 enclosed in the dotted lines is substantially the same as the circuit described in RCA Application Note AN 131 dated March 1, 1948, together with the Erratum Notice dated July 15, 1948, for this application note and illustrated in Fig. 2 thereof. This circuit may be considered a cycling circuit having two conditions of stability. The resemblance of this gas tube circuit to an ordinary multivibrator circuit, which also may be termed a cycling circuit having two conditions of stability, each assumed cyclically and repetitively for a predetermined period of time to the exclusion of the other, will be readily recognized. The relay 432 is actuated when one of the gas tubes in the circuit 430 is on and is non-actuated when the other gas tube is on so that the relay contacts are actuated or non-actuated respectively in accordance with the condition of the circuit. The relay contacts are placed in series with one of the leads from the transformer 202 of Fig. 3 to the terminals 200 whereby application of the signals to the receiver is interrupted when the contacts are opened by open-circuiting this lead and restored when the contacts are closed. The circuit described in the application note provides for one cycling period of .3 of a second for one condition and it may be set to open the relay 432 for this period of time. The relay may be closed for 1.7 seconds for the other condition of the cycling circuit. It will be obvious to those skilled in the art that the circuit constants may be altered to vary the cycling periods. The switch 434 in the circuit 430 merely interchanges the "on" and "off" intervals as pointed out in the application note.

A third suitable arrangement for interrupting the signal is illustrated in Fig. 7 wherein the terminals 100 of Fig. 1 are connected respectively to one of the terminals of transformer 202 and to the grid 436 of a vacuum tube 438 which is normally biased to cut off the tube output by a bias applied through a grid resistor 440. A resistor 442 serves as the anode load. A multivibrator circuit 444 is provided, the output being taken from the anode of one of the tubes and fed through a resistor 446 to the grid 436. This arrangement is a keying arrangement whereby when the voltage at the anode 448 of one of the multivibrator tubes is positive, the biased voltage at the grid 436 is overcome sufficiently to enable the tube 438 to conduct and amplify the signals applied to its grid. When the voltage at the anode 448 becomes more negative, tube 438 is cut off. The bias supply C— and the resistors 440 and 446 must be appropriately chosen. It will be clear that any keying arrangement which interrupts signals long enough to cause actuation of the danger indicator in the receiver will be suitable.

It will be apparent that I have described and illustrated means and method of securing fail-safe operation by the cyclic interruption and restoration of the reception of signals in a receiver in the type of railway signalling system herein illustrated. It will also be apparent that the said means and methods may be applicable to other systems, for example that disclosed in the copending application of Korman et al., Serial No. 75,342, filed February 9, 1949, and entitled "Measuring," now Patent 2,698,377. The invention may also be applied to such systems as that disclosed in the application of Nathaniel I. Korman, Serial No. 31,287, filed November 20, 1948, and entitled "Traffic Control." In the latter application, if an automatic gain control voltage is used in the receiver in the radar system it may be adjusted to increase the gain when no signal is received by the receiver to such a degree that the receiver noise due to the high gain acts as though a continuous reflection were being received. Such signal noise will cause the control apparatus, which may be a danger light, to be flashed when reception is prevented for a substantial period compared to the pulse repetition rate, just as though an object reflecting pulses were located very close to the train carrying the equipment. It will thus be seen that the invention has extremely wide application and may be used in widely differing apparatus, wherever the interruption of the received signal may be used to cause a danger indication.

What I claim is:

1. In a signalling system having a receiver with an indicator with at least two indicating conditions, one of danger and one of non-danger, the latter being dependent on the continual reception of signals, said system being subject to failures, the combination comprising means under safe conditions to apply said signals to said receiver, means under safe conditions to interrupt said signals for a time sufficiently long under normal non-failure operation to cause a danger response of said indicator, means to restore said signal reception for a time sufficiently long under normal non-failure operation to cause a non-danger response, and means to continually and cyclically actuate said interrupting means and said restoring means, whereby only under non-danger and non-failure conditions and not otherwise said indicator cyclically assumes each of said two conditions and fail-safe operation may be secured.

2. For a railway signalling system having a vehicle, and an indicator carried thereby having at least two indicating conditions, one of danger and one of non-danger, the combination with a receiver to be carried by said vehicle and having an input and an output connected to actuate said indicator to a non-danger indicating condition on the continual reception of signals at the input thereof and to actuate said indicator to a danger indicating condition on the failure to receive said signals, said system being subject to failures, of means to cyclically interrupt and restore said signals at said input to cyclically actuate said indicator to a danger and non-danger condition respectively, whereby failure of the indicator cyclically to assume a non-danger and a danger condition is indicative of danger or failure of the system or both and fail-safe operation is secured.

3. For a railway signalling system having a vehicle, and an indicator having at least two indicating conditions, one of danger and one of non-danger, the combination with a receiver carried by the vehicle and having a pair of input leads and an output to be connected to actuate said indicator to a non-danger indicating condition on the continual reception of signals at the input thereof, and to a danger indicating condition on the failure to receive said signals, said system being subject to failures, of means to cyclically interrupt and restore said signals to cyclically actuate said indicator to a danger and non-danger condition respectively, said means comprising a cyclically actuated switch short-circuiting said leads, whereby failure of the indicator cyclically to assume a non-danger and a danger condition is indicative of danger or failure of the system or both and fail-safe operation is secured.

4. For a railway signalling system having a vehicle, and an indicator having at least two indicating conditions, one of danger and one of non-danger, the combination with a receiver carried by the vehicle and having an input lead and an output connected to actuate said indicator to a non-danger indicating condition on the continual reception of signals at the input thereof, and to a danger indicating condition on the failure to receive said signals, said system being subject to failures, of means to cyclically interrupt and restore said signals at said input to cyclically actuate said indicator to a danger and non-danger condition respectively, said means comprising a cyclically actuated switch open-circuiting said lead, whereby failure of the indicator cyclically to assume a non-danger and a danger condition is indicative of danger or failure of the system or both and fail-safe operation is secured.

5. The combination claimed in claim 2, said means comprising a cam driven at a substantially continuous rate, and a switch actuated by said cam.

6. The combination claimed in claim 2, said means comprising a cycling circuit having two conditions of stability, each assumed cyclically and repetitively for a predetermined period of time to the exclusion of the other, and a relay having contacts actuated and non-actuated respectively by said circuit according to its condition.

7. The combination claimed in claim 2, said means comprising a circuit component having cathode, anode, and control electrodes, the output from said component being responsive to voltages applied between said cathode and control electrodes, means cyclically and repetitively to apply a voltage between said input and control electrodes to cut-off said output, and means to apply said signal between said cathode and control electrodes.

8. The combination claimed in claim 2, said means comprising a discharge tube having a cathode, an anode, and a control electrode, means cyclically and repetitively to apply a voltage between said cathode and control electrodes to cut off the discharge of said tube, and means to apply said signal between said cathode and control electrodes.

9. In a signalling system having a receiver with two indications, one dependent on the continual reception of signals under safe conditions, the other responsive to a danger condition, said system being subject to failures, the combination comprising means under safe conditions to apply said signals to said receiver, means under safe conditions to interrupt said signal application for a time sufficiently long under normal non-failure receiver operation to cause the other indicating condition of said receiver, thereby to simulate briefly a danger condition, and to restore said signal application, and means continually and cyclically to actuate said interrupting and said restoring means, whereby only under non-danger and non-failure conditions and not otherwise said indicator cyclically assumes each of said conditions, and fail-safe operation is secured.

10. The combination claimed in claim 9, the said means to interrupt and to restore said signal application comprising a cam driven at a substantially constant rate, and a switch actuated by said cam.

11. The combination claimed in claim 9, said means to interrupt and to restore said signal application comprising a cycling circuit having two conditions of stability, each assumed cyclically and repetitively for a predetermined period of time to the exclusion of the other, and a relay having contacts actuated and non-actuated respectively by said circuit according to its condition.

12. The combination claimed in claim 9, said means to interrupt and to restore said signal application comprising a tube having anode, cathode, and control electrodes, and means cyclically and repetitively to apply a cut-off voltage between said cathode and control electrodes.

13. For a railway signalling system having a train, and an indicator carried thereby having at least two indicating conditions, one of danger and one of non-danger, the combination with a receiver to be carried by said train and having an input and an output connected to actuate said indicator to a non-danger indicating condition on the continual reception of signals at the input thereof and to actuate said indicator to a danger indicating condition on the failure to receive said signals, said system being subject to failures, of means to cyclically interrupt and restore said signals at said input to cyclically actuate said indicator to a danger and non-danger condition respectively, whereby failure of the indicator cyclically to assume a non-danger and a danger condition is indicative of danger or failure of the system or both and fail-safe operation is secured.

14. For a railway signalling system having a train, and an indicator having at least two indicating conditions, one of danger and one of non-danger, the combination with a receiver carried by the train and having a pair of input leads and an output to be connected to actuate said indicator to a non-danger indicating condition on the continual reception of signals at the input thereof, and to a danger indicating condition on the failure to receive said signals, said system being subject to failures, of means to cyclically interrupt and restore said signals to cyclically actuate said indicator to a danger and non-danger condition respectively, said means comprising a cyclically actuated switch short-circuiting said leads, whereby failure of the indicator cyclically to assume a non-danger and a danger condition is indicative of danger or failure of the system or both and fail-safe operation is secured.

15. For a railway signalling system having a train, and an indicator having at least two indicating conditions, one of danger and one of non-danger, the combination with a receiver carried by the train and having an input lead and an output connected to actuate said indicator to a non-danger indicating condition on the continual reception of signals at the input thereof, and to a danger indicating condition on the failure to receive said signals, said system being subject to failures, of means to cyclically interrupt and restore said signals at said input to cyclically actuate said actuator to a danger and non-danger condition respectively, said means comprising a cyclically actuated switch open-circuiting said lead, whereby failure of the indicator cyclically to assume a non-danger and a danger condition is indicative of danger or failure of the system or both and fail-safe operation is secured.

References Cited in the file of this patent

UNITED STATES PATENTS

| | | |
|---|---|---|
| 1,291,861 | Harlow | Jan. 21, 1919 |
| 1,690,459 | Sasnett | Nov. 6, 1928 |
| 1,690,505 | Sasnett | Nov. 6, 1928 |
| 1,710,499 | Lewis | Apr. 23, 1929 |
| 1,900,723 | Miller | Mar. 7, 1933 |
| 1,924,215 | Nicholson | Aug. 29, 1933 |